(12) United States Patent
Takaki et al.

(10) Patent No.: US 10,100,759 B2
(45) Date of Patent: Oct. 16, 2018

(54) EXHAUST GAS RECIRCULATION CONTROL DEVICE AND EXHAUST GAS RECIRCULATION CONTROL METHOD

(71) Applicant: NISSAN MOTOR CO., LTD., Yokohama-shi, Kanagawa (JP)

(72) Inventors: Daisuke Takaki, Kanagawa (JP); Hirofumi Tsuchida, Kanagawa (JP); Kazuhiko Sugawara, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 35 days.

(21) Appl. No.: 15/305,518

(22) PCT Filed: Apr. 25, 2014

(86) PCT No.: PCT/JP2014/061706
§ 371 (c)(1),
(2) Date: Oct. 20, 2016

(87) PCT Pub. No.: WO2015/162779
PCT Pub. Date: Oct. 29, 2015

(65) Prior Publication Data
US 2017/0045008 A1     Feb. 16, 2017

(51) Int. Cl.
*F02D 41/00*     (2006.01)
*F02M 26/00*     (2016.01)
(Continued)

(52) U.S. Cl.
CPC ..... *F02D 41/0052* (2013.01); *F02D 41/0007* (2013.01); *F02D 41/08* (2013.01);
(Continued)

(58) Field of Classification Search
CPC .. F02D 41/0007; F02D 41/0052; F02D 41/08; F02D 41/16; F02D 2041/0017; F02M 26/06; Y02T 10/144
(Continued)

(56) References Cited

U.S. PATENT DOCUMENTS

2010/0186727 A1*    7/2010    Kaneko ................ F02D 21/08
                                                                                123/568.21
2011/0226223 A1    9/2011    Potteau et al.
(Continued)

FOREIGN PATENT DOCUMENTS

JP           9-209798 A     8/1997
JP          10-047120 A     2/1998
(Continued)

*Primary Examiner* — Patrick Maines
*Assistant Examiner* — Dapinder Singh
(74) *Attorney, Agent, or Firm* — Foley & Lardner LLP

(57) ABSTRACT

An exhaust gas recirculation control device controls an exhaust gas recirculation device that includes an exhaust gas recirculation passage adapted to circulate a portion of exhaust gas of an internal combustion engine from an exhaust passage downstream of a turbine of a turbo supercharger along an exhaust flow to an intake passage upstream of a compressor of the turbo supercharger along an intake flow and downstream of an air flow meter along the intake flow, and a recirculation control valve adapted to adjust an amount of exhaust gas circulated to the intake passage. Furthermore, the exhaust gas recirculation control device includes recirculation ratio setting means adapted to set a lower target recirculation ratio for a smaller intake air amount of the internal combustion engine.

3 Claims, 3 Drawing Sheets

(51) Int. Cl.
- *F02M 26/06* (2016.01)
- *F02D 41/08* (2006.01)
- *F02D 41/16* (2006.01)
- *F02M 26/05* (2016.01)
- *F02M 26/64* (2016.01)

(52) U.S. Cl.
CPC ............. *F02D 41/16* (2013.01); *F02M 26/00* (2016.02); *F02M 26/05* (2016.02); *F02M 26/06* (2016.02); *F02M 26/64* (2016.02); F02D 2041/0017 (2013.01); *Y02T 10/121* (2013.01)

(58) Field of Classification Search
USPC .................................................. 60/602, 605.2
See application file for complete search history.

(56) References Cited

U.S. PATENT DOCUMENTS

2012/0117011 A1* 5/2012 Hashimoto ......... F02D 13/0226
                                                              706/23
2012/0303346 A1   11/2012 Takezoe et al.

FOREIGN PATENT DOCUMENTS

| JP | 10-122057 A | 5/1998 |
| JP | 2002-221102 A | 8/2002 |
| JP | 2012-512988 A | 6/2012 |
| JP | 2013-011270 A | 1/2013 |
| WO | WO 2008/027122 A1 | 3/2008 |

* cited by examiner

EXHAUST GAS RECIRCULATION CONTROL DEVICE AND EXHAUST GAS RECIRCULATION CONTROL METHOD

TECHNICAL FIELD

The present invention relates to an exhaust gas recirculation control device and an exhaust gas recirculation control method, of an internal combustion engine.

BACKGROUND ART

There is known an exhaust gas recirculation (EGR: Exhaust Gas Recirculation) device, in which a portion of exhaust gas is recirculated to an intake side to prevent knocking and to improve fuel consumption, in an internal combustion engine. JP2012-512988A defines a percentage of mass of recirculated exhaust gas (EGR gas) entering an intake circuit per unit time with respect to a total mass of air-fuel mixture entering a combustion chamber per unit time as an EGR ratio [%], and discloses a relationship of the EGR ratio with a compression ratio of the internal combustion engine, which is optimum for preventing knocking and improving fuel consumption. More specifically, when a load ratio of the internal combustion engine is of a high load of 50% or more, the relationship is to be of a value subtracting 13 from three times the compression ratio (tolerance: 2), and when the load ratio is of a low load of less than 50%, the relationship is of a value subtracting 13 from three times the compression ratio (tolerance: 5).

SUMMARY OF INVENTION

Generally, an EGR device includes an EGR passage that branches from an exhaust passage and joins to an intake passage, and an EGR valve that opens and closes the EGR passage, and is configured to open the EGR valve depending on a target EGR ratio, to allow EGR gas to flow into the intake side due to differential pressure between the exhaust side and the intake side. Furthermore, a controller sets the target EGR ratio to an engine operating state of the internal combustion engine, and controls an ignition timing with respect to the target EGR ratio. Therefore, when the amount of the EGR gas that has actually passed through the EGR valve (true EGR gas amount) is smaller than a target EGR gas amount, knocking may occur if operated at an ignition timing corrected assuming that the target EGR ratio is achieved.

The target EGR gas amount and the true EGR gas amount easily diverges when the differential pressure between the exhaust side and the intake side is small. Pressure loss decreases with a cooler exhaust system such as an exhaust gas purifying catalyst; for example when the EGR valve opens in a state in which the exhaust system is cooled, the differential pressure between the exhaust side and the intake side is small since the pressure on the exhaust passage is low. Moreover, an exhaust flow rate decreases with a lower intake air amount, and it becomes difficult for the pressure on the exhaust side to increase; as a result, the differential pressure between the exhaust side and the intake side becomes small.

That is to say, the smaller the intake air amount, the lower the true EGR gas ratio with respect to the target EGR gas ratio, and the possibility that knocking would occur will increase.

However, the above document does not take the intake air amount into consideration, and sets the same EGR ratio as long as the load is the same, regardless of engine revolution speed. Accordingly, for example, in a low-revolution high-load region, that is, in a region having a low intake air amount although the load is high, knocking occurs more easily due to the divergence between the target EGR gas amount and the true EGR gas amount.

An object of the present invention is to provide an EGR control device that controls an EGR device in order to be able to prevent an occurrence of knocking even in a state in which divergence between the target EGR ratio and the true EGR ratio may easily occur.

DESCRIPTION OF EMBODIMENTS

Described below is an embodiment of the present invention, with reference to drawings.

Figure 1:
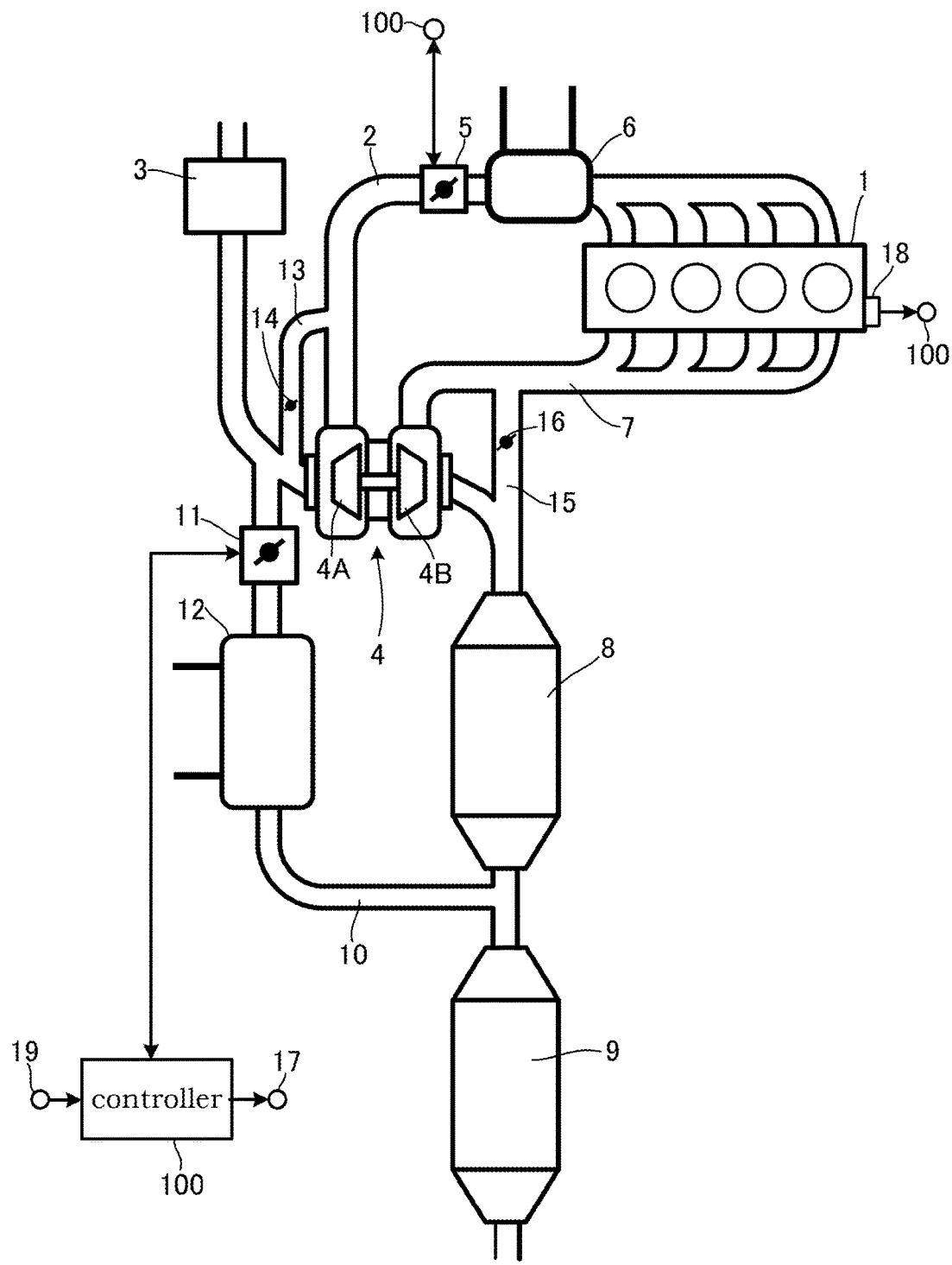
FIG. 1 is a block diagram of an internal combustion engine system that applies the present embodiment.

FIG. 1 is a block diagram of an internal combustion engine system that applies an embodiment of the present invention.

An intake passage 2 of an internal combustion engine 1 is arranged to have, from upstream of an intake flow, an air flow meter 3, a compressor 4A of a turbo supercharger 4, a throttle chamber 5, and a collector tank 6 integral with intercooler.

The present system includes a recirculation passage 13 that communicates an upstream side and a downstream side of the compressor 4A, and a recirculation valve 14 that opens when decelerated to return the intake from the downstream side of the compressor 4A to the upstream side thereof.

Meanwhile, an exhaust passage 7 is arranged to have, from upstream of the exhaust flow, a turbine 4B of the turbo supercharger 4, a manifold catalyst 8, and an underfloor catalyst 9. The present system includes a bypass passage 15 that communicates an upstream side and downstream side of the turbine 4B, and a valve 16 that opens and closes the flow passage of the bypass passage 15.

The manifold catalyst 8 and the underfloor catalyst 9 are both a catalytic device for purifying exhaust gas. The manifold catalyst 8 is arranged at a position close to the turbine 4B on a downstream side thereof so that exhaust gas can flow therein at a high temperature. The underfloor catalyst 9 is greater in volume than the manifold catalyst 8, and is arranged under the floor of the vehicle.

Moreover, the present system includes an exhaust gas recirculation device (hereinafter, also called "EGR device"). The EGR device is configured including an exhaust gas recirculation passage (hereinafter, also called "EGR passage") 10 that branches from between the manifold catalyst 8 and the underfloor catalyst 9 of the exhaust passage 7 and joins to the intake passage 2 at a position upstream of the compressor 4A and downstream of the air flow meter 3, and an exhaust gas recirculation valve (hereinafter, also called "EGR valve") 11 that adjusts an amount of exhaust gas (hereinafter, also called "EGR gas") passing through the EGR passage 10. Furthermore, the device may include an EGR gas cooler 12 for cooling the EGR gas.

As described above, the EGR device of the present embodiment is what is called a low pressure EGR device that recirculates a portion of the exhaust gas from downstream of the turbine 4B to upstream of the compressor 4A and downstream of the air flow meter 3.

The internal combustion engine system described above further includes: a crank angle sensor 18 for detecting revolution speed of the internal combustion engine 1 (hereinafter, also called engine revolution speed); and an accelerator pedal position sensor 19, and detected values of these sensors and the air flow meter 3 are read into the controller 100. The controller 100 performs, on the basis of the detected values read in, controls such as ignition control, fuel injection control, throttle valve position control, and control of the EGR device (EGR control).

In the EGR control, the controller 100 first determines a target EGR ratio by for example searching the map on the basis of an engine operating state (for example revolution speed and load), and controls the EGR valve 11 to a position according to the target EGR ratio. How the target EGR ratio is set will be described later. The position of the EGR valve 11 according to the target EGR ratio is determined by mapping a relationship of the target EGR ratio with the position of the EGR valve 11 in advance and searching this map.

Once the target EGR ratio is determined, the controller 100 sets an ignition timing on the basis of the target EGR ratio.

Next describes how to set the target EGR ratio.

Figure 2:
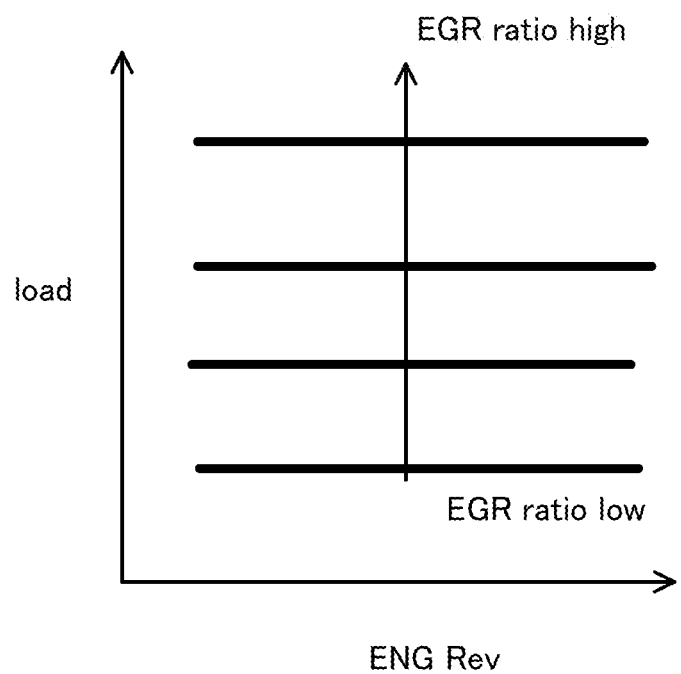
FIG. 2 is a view showing one example of a target EGR ratio map.

FIG. 2 is a view showing one example of a publicly known target EGR map. This map sets the target EGR ratio in terms of preventing knocking and improving fuel consumption; with identical loads, the target EGR ratio are the same regardless of the engine revolution speed, and with identical engine revolution speed, the target EGR ratio increases as the load increases.

The EGR device circulates exhaust gas to the intake side by making use of a differential pressure between the exhaust side and the intake side. With what is called a high pressure EGR device that circulates the exhaust gas to a downstream side of the throttle chamber 5, the intake side is of a negative pressure and thus the differential pressure between the exhaust side and the intake side may easily increase. However, with the low pressure EGR device, the intake side is of an atmospheric pressure; as the pressure on the exhaust side decreases the differential pressure also decreases, thus making it difficult for the exhaust gas to circulate. Furthermore, the lower the temperature of the exhaust system (manifold catalyst 8, underfloor catalyst 9, exhaust passage itself, etc.), the pressure loss in the exhaust system is reduced; with the exhaust system in a low temperature state, it is difficult for the pressure of the exhaust passage 7 to increase. Moreover, as the engine revolution speed decreases, the intake air amount is reduced, and accompanying this, the exhaust flow rate also decreases, thereby making it difficult for the pressure on the exhaust side to increase. As a result, no differential pressure will occur as much.

Therefore, in a case in which, for example, an operating point switches over to a low-revolution high-load region that performs EGR control from a state in which the temperature of the exhaust system is reduced due to a long term idling operation, the EGR gas amount required for achieving the target EGR ratio does not circulate due to the small differential pressure, and the actual EGR ratio becomes lower with respect to the target EGR ratio.

Moreover, assuming that an EGR gas amount sufficient to prevent the occurrence of knocking will be introduced, the ignition timing is controlled to be more advanced with a larger target EGR ratio. Therefore, the larger the target EGR ratio, the easier the knocking occurs when the target EGR ratio and the actual EGR ratio diverges.

That is to say, when a target EGR ratio is set as in the EGR map in FIG. 2, knocking easily occurs in the low-revolution high-load regions, particularly when the exhaust system is of a low temperature. When the knocking occurs, not only is the deterioration of the internal combustion engine 1 promoted, but in a case of a car with high-octane fuel specifications, there is a possibility that in the fuel properties and conditions determination it is mistakenly determined as using regular fuel although high-octane fuel is used. Being mistakenly determined as such, the ignition timing is retarded and the output of the internal combustion engine 1 is reduced in order to prevent the knocking from occurring even when using regular fuel, and thus the operability in regions other than the low revolution speed region decreases, even in regions where the knocking hardly occurs.

As a method for preventing the above mentioned knocking, there is a method which sets the EGR ratio set in the EGR map of FIG. 2 to a value in which no knocking occurs even if there is a divergence between the target EGR ratio and the actual EGR ratio, that is to say, setting the EGR ratio to a smaller value on the assumption that the exhaust system is of a low temperature. However, by setting such a target EGR ratio, a region in which the differential pressure easily increases since the intake air amount is great, as like the high revolution region, would have a target EGR ratio smaller than necessary, which would reduce the fuel consumption improving effect by the EGR control.

On this account, the present embodiment sets the target EGR ratio as described below.

Figure 3:
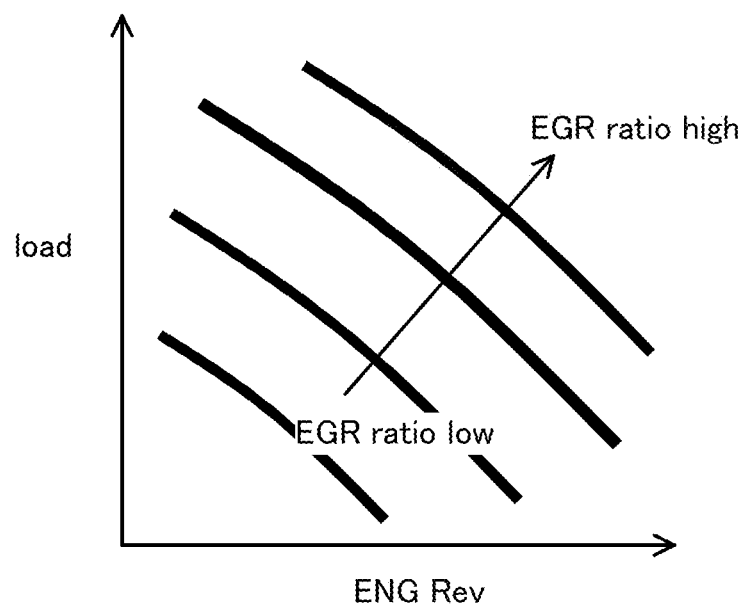
FIG. 3 is a view showing one example of a target EGR ratio map according to the present embodiment.

FIG. 3 is a target EGR ratio map used in the present embodiment. In the target EGR ratio map of FIG. 3, with identical loads, the target EGR ratio increases as the engine revolution speed increases, and with identical engine revolution speeds, the target EGR ratio increases as the load increases. Furthermore, the curve showing each of the EGR ratios in FIG. 3 matches an equal intake air amount curve. That is to say, the target EGR ratio map of FIG. 3 is set with a target EGR ratio on the basis of the intake air amount, and the more the intake air amount, the greater the target EGR ratio, and the less the intake air amount, the smaller the target EGR ratio.

In the actual control, the controller 100 may perform the correction on the basis of the intake air amount detected by the air flow meter 3, so that the target EGR ratio set in the target EGR ratio map of FIG. 2 becomes the target EGR ratio shown in the target EGR ratio map of FIG. 3 as a result. In this case, the less the intake air amount is, the greater the correction amount for reducing the target EGR ratio. Moreover, the greater the intake air amount is, the greater the correction amount for increasing the target EGR ratio.

By setting the target EGR ratio as described above, in the target EGR ratio map of FIG. 3, the target EGR ratio is smaller in the low revolution speed region and the target EGR ratio is larger in the high revolution speed region, as compared to the target EGR ratio map in FIG. 2.

With a small target EGR ratio in the low revolution speed region, the target EGR ratio is more easily achieved even if the differential pressure between the exhaust side and the intake side is small; this makes it difficult for the knocking in the low-revolution high-load region as described above to occur.

Moreover, in the high revolution speed region, the differential pressure easily generates due to the large amount of the intake air amount; this makes it difficult for the divergence to occur between the target EGR ratio and the actual EGR ratio, and hence it is difficult for the knocking to occur. Therefore, as with the target EGR ratio map in FIG. 3, by setting a larger target EGR ratio from a lower load, it is possible to improve the fuel consumption improving effect by introducing the EGR gas.

Figure 4:
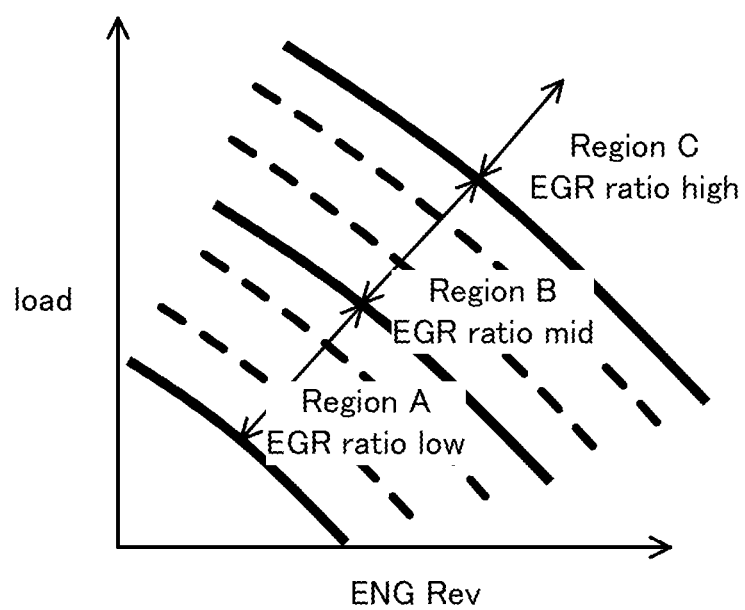
FIG. 4 is a view showing another example of a target EGR ratio map according to the present embodiment.

The target EGR ratio map is not limited to the one shown in FIG. 3, and the target EGR ratio may change stepwise per predetermined intake air amount range. For example, as shown in FIG. 4, the map may be one in which the operating region is divided into region A, region B, and region C according to the intake air amount, and while having uniform target EGR ratio within each of the regions, a larger target EGR ratio is set for a region having a larger amount of the intake air amount.

By using a target EGR ratio map in which the target EGR ratio changes stepwise per predetermined intake air amount range as described above, the target EGR ratio will not vary when the engine operating state changes by a small amount. That is to say, the variation in the target EGR ratio during operation is reduced. This thus allows for avoiding any complexity in the ignition timing correction that accompanies the change in the target EGR ratio and the opening and closing movement of the EGR valve 11.

The above describes an embodiment of the present invention, however the above embodiment merely shows one part of an applied example of the present invention and has no intention to limit the technical scope of the present invention to the specific configurations disclosed in the above embodiment.

The invention claimed is:

1. An exhaust gas recirculation control device configured to control an exhaust gas recirculation device, comprising:
   an exhaust gas recirculation passage configured to circulate a portion of exhaust gas of an internal combustion engine from an exhaust passage downstream of a turbine of a turbo supercharger along an exhaust flow to an intake passage upstream of a compressor of the turbo supercharger along an intake flow;
   a recirculation control valve configured to adjust an amount of exhaust gas circulated to the intake passage; and
   a programmable controller programmed to:
      set a target recirculation ratio,
         wherein a curve connecting engine operating points having equal target recirculation ratios matches an equal intake air amount curve achieved by connecting engine operating points with equal intake air amounts of the internal combustion engine, and the smaller an intake air amount of the internal combustion engine is, the lower the target recirculation ratio is, and
      control a position of the recirculation control valve according to the target recirculation ratio.

2. The exhaust gas recirculation control device according to claim 1,
   wherein the controller is further programmed to prevent the target recirculation ratio from changing within a predetermined intake air amount range.

3. An exhaust gas recirculation control method of controlling an exhaust gas recirculation device,
   the exhaust gas recirculation device comprising:
      an exhaust gas recirculation passage configured to recirculate a portion of exhaust gas of an internal combustion engine to an intake passage upstream of a compressor of the turbo supercharger along an intake flow, and
      a recirculation control valve configured to adjust an amount of exhaust gas recirculated to the intake passage,
   the exhaust gas recirculation control method comprising:
      setting a target recirculation ratio, to achieve a curve connecting engine operating points having equal target recirculation ratios that match an equal intake air amount curve achieved by connecting engine operating points having equal intake air amounts of the internal combustion engine, and to achieve a lower value of the target recirculation ratio for a smaller amount of an intake air amount; and
      controlling a position of the recirculation control valve according to the target recirculation ratio.

* * * * *